United States Patent [19]

Carlson

[11] Patent Number: 5,018,606

[45] Date of Patent: May 28, 1991

[54] ELECTROPHORETIC FLUID DAMPER

[75] Inventor: J. David Carlson, Cary, N.C.

[73] Assignee: Lord Corporation, Erie, Pa.

[21] Appl. No.: 463,138

[22] Filed: Jan. 10, 1990

[51] Int. Cl.$^5$ ............................ F16F 9/53; F16F 15/03
[52] U.S. Cl. ........................................ 188/267; 188/300
[58] Field of Search ................... 188/267, 300, 322.15, 188/322.22, 322.5; 267/140.1 E, 140.1 AE

[56] References Cited

U.S. PATENT DOCUMENTS

| | | | |
|---|---|---|---|
| 2,940,749 | 6/1960 | Kemelhor | 188/267 X |
| 2,973,969 | 3/1961 | Thall | 188/267 X |
| 3,174,587 | 3/1965 | Walton | 188/267 |
| 3,207,269 | 9/1965 | Klass | 188/269 |
| 3,255,853 | 6/1966 | Klass et al. | 192/21.5 |
| 4,782,927 | 11/1988 | Sproston et al. | 192/21.5 |
| 4,790,522 | 12/1988 | Drutchas | 267/225 |
| 4,819,772 | 4/1989 | Rubel | 188/267 X |
| 4,896,754 | 1/1990 | Carlson et al. | 192/21.5 |

FOREIGN PATENT DOCUMENTS 2111171 7/1985 United Kingdom .

OTHER PUBLICATIONS

Carlson, et al., U.S. patent application Ser. No. 07/246,847, filed Sep. 20, 1988.
Carlson, U.S. patent application Ser. No. 07/463,276, filed Jan. 10, 1990.
Carlson, U.S. patent application Ser. No. 07/463,245, filed Jan. 10, 1990.

Primary Examiner—Robert J. Oberleitner
Assistant Examiner—Alfred Muratori
Attorney, Agent, or Firm—David L. McCombs; W. Graham Buie

[57] ABSTRACT

An electrophoretic fluid damper in which cooperable electrodes are slidably disposed one within the other and are connected respectively to relatively movable members. An electrophoretic fluid capable of separating into particle-rich and particle-deficient phases by electrophoresis operates in surface contact with the electrodes. An electrically nonconductive material having raised surface areas and spaces between the surface areas is associated with one of the electrodes. When a voltage is applied between the electrodes in a first direction, the particle-rich phase of the fluid collects on one of the electrodes and also makes contact with the spaces and the raised surface areas of the material associated with the other electrode thereby engaging or locking the electrodes together and transmitting force between the members. When the voltage potential is applied in the opposite direction, the particle-rich phase migrates to the other electrode and collects in the spaces between the raised surfaces of the material, thereby disengaging the electrodes and reducing the transmission of force between the elements. The apparatus may be configured as a shock absorber or linear brake.

17 Claims, 4 Drawing Sheets

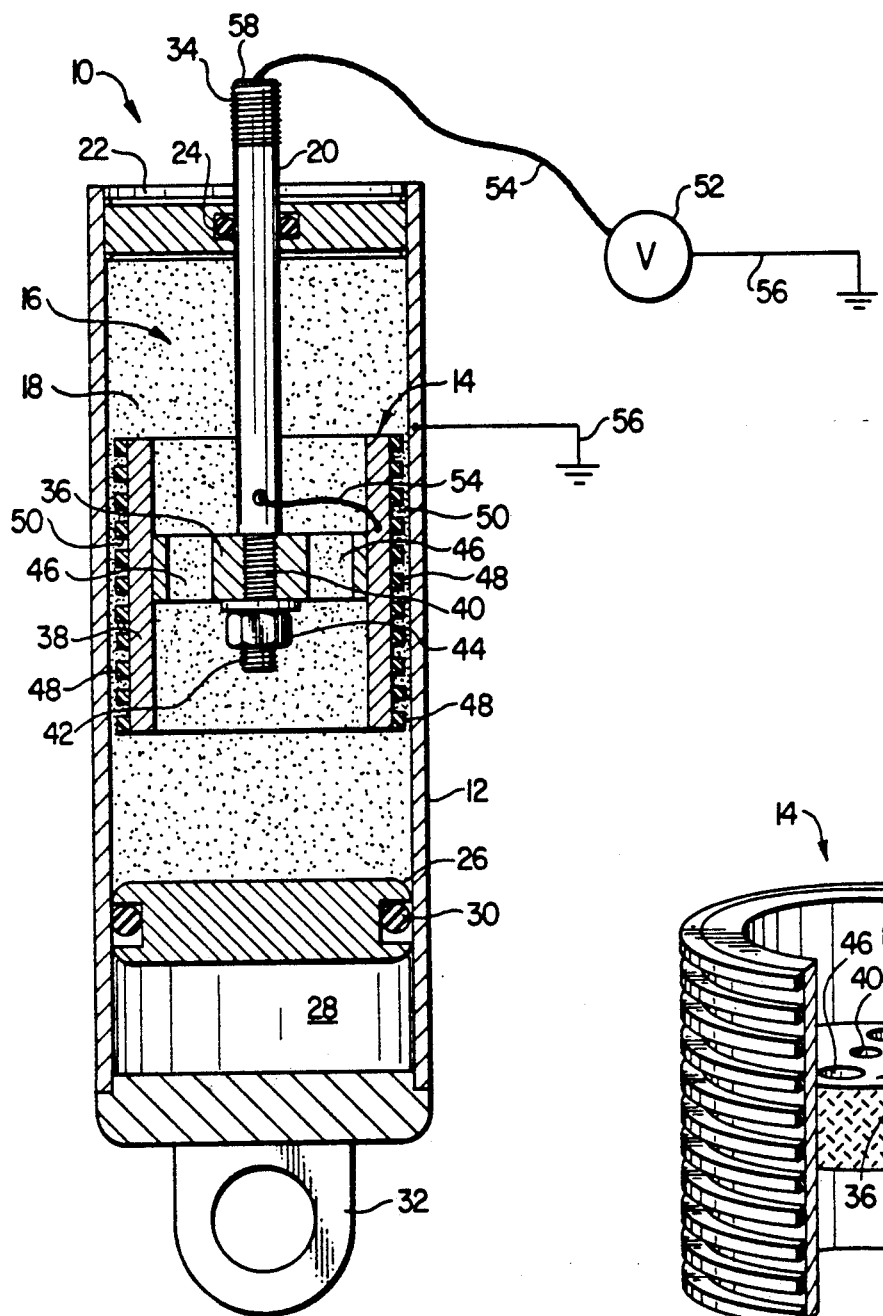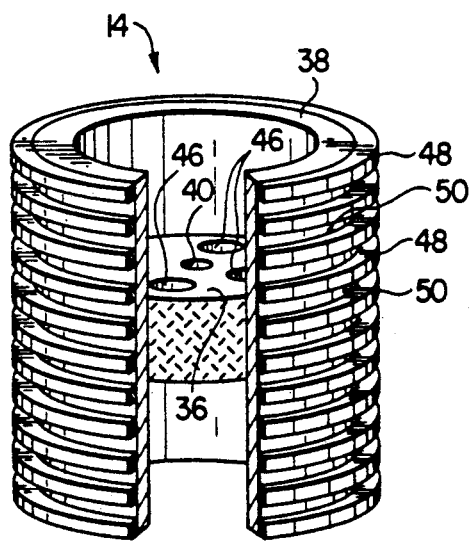
FIG. 1
FIG. 2

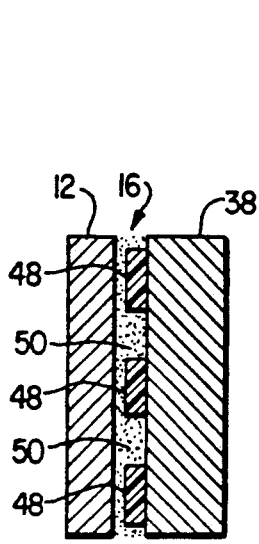
FIG. 3a
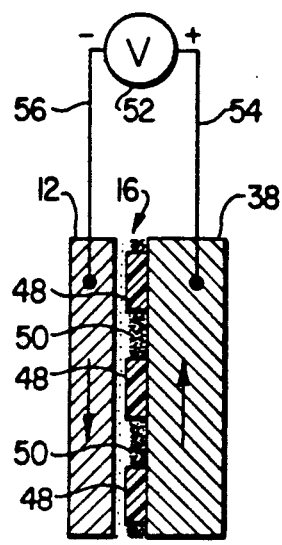
FIG. 3b
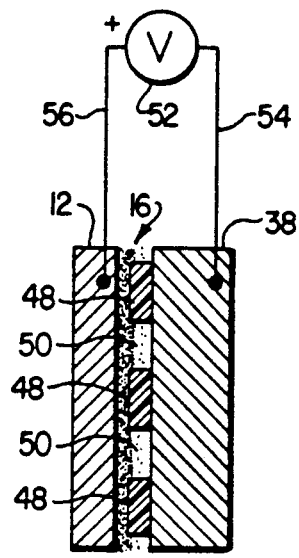
FIG. 3c
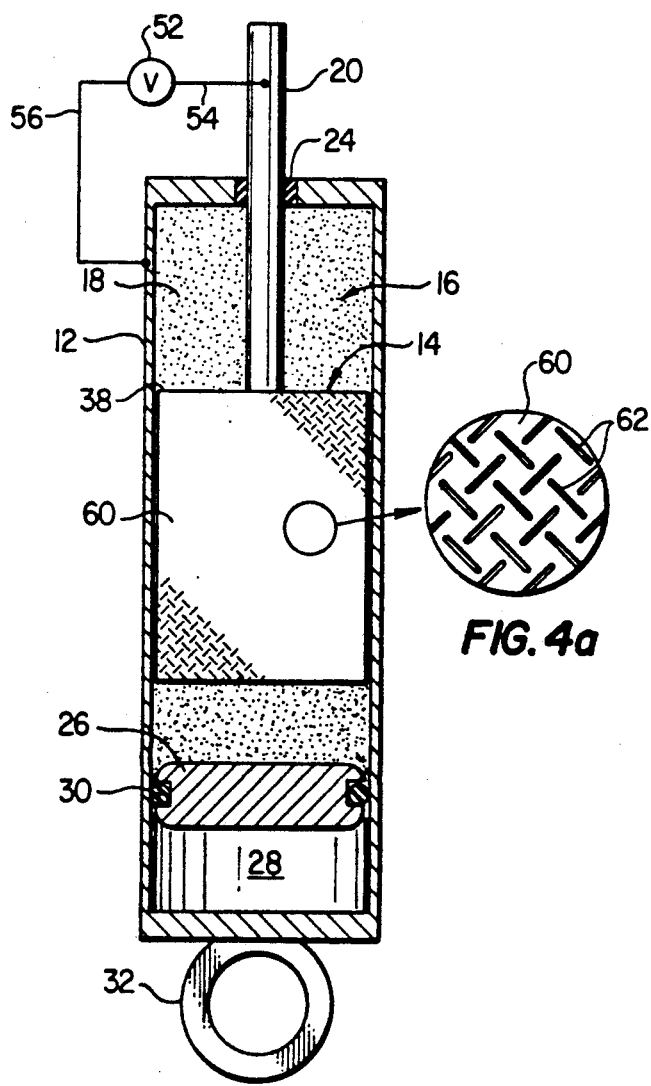
FIG. 4
FIG. 4a

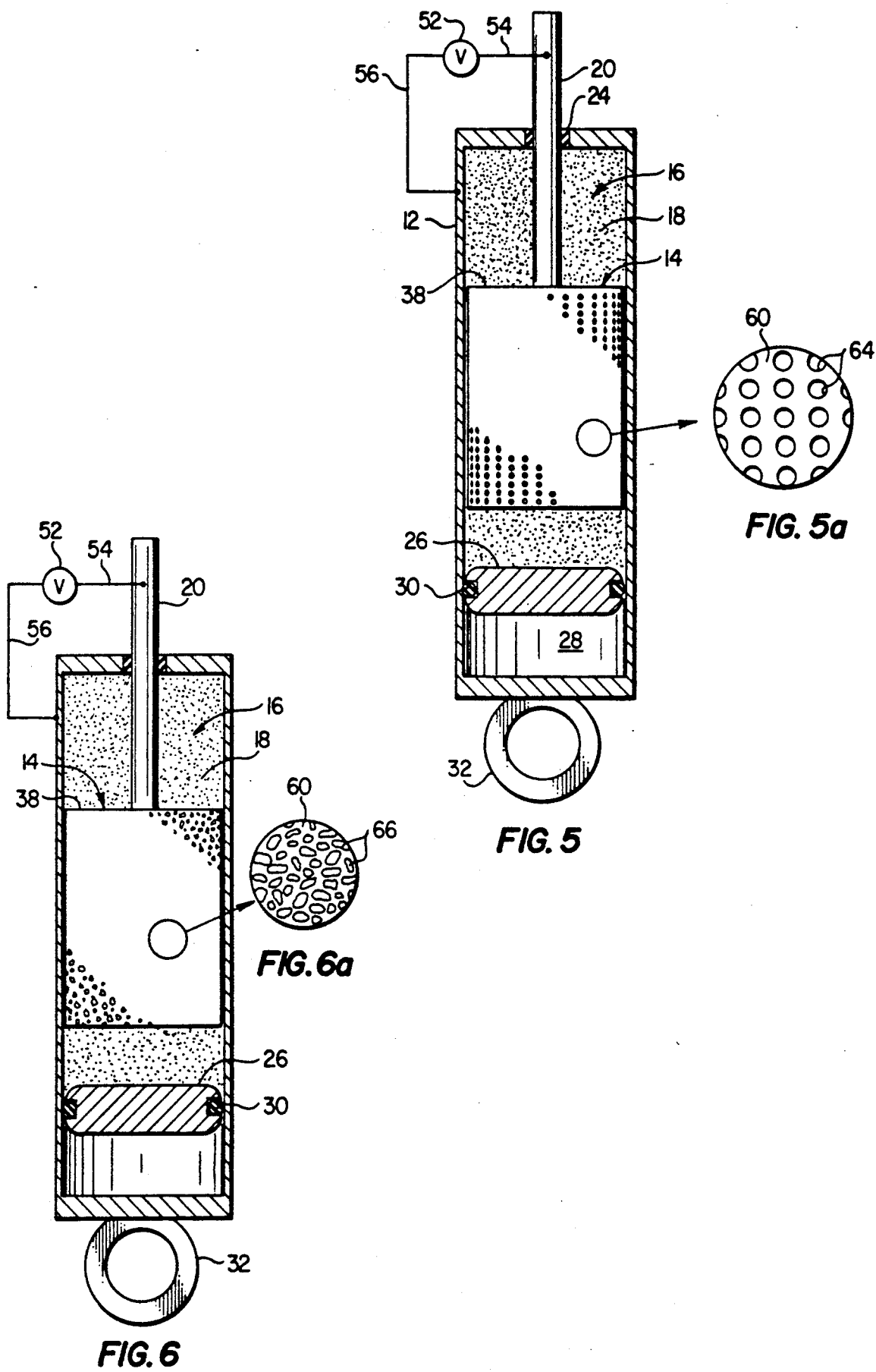

ELECTROPHORETIC FLUID DAMPER

FIELD OF THE INVENTION

The present invention relates in general to fluid damper assemblies of the piston-and-cylinder type. More specifically, the present invention relates to an improved fluid damper assembly of the above type which uses an electrophoretic fluid to produce variable damping or braking characteristics.

BACKGROUND OF THE INVENTION

Damper assemblies which incorporate mechanically actuated or movable valve elements to change the damping coefficient of the assembly are well known and typically operate using conventional hydraulic fluids. In order to improve the performance characteristics of controllable dampers and improve their reliability under harsh or repetitive operating conditions, electroactive fluids having controllable physical properties may be employed in conjunction with the damper to substantially reduce the required number of moving components and operation response time.

Electroactive fluids consist of suspensions of very fine particles in a dielectric liquid media. The most widely used type of electroactive fluids are electrorheological (or "electroviscous") fluids. Electrorheological fluids are electroactive fluids which, in the absence of an electric field, exhibit traditional Newtonian flow characteristics such that their shear rate is directly proportional to shear stress. However, when an electric field on the order of $10^3$ V/mm is applied, a yield/stress phenomenon occurs such that no shearing of the fluid takes place until the shear stress exceeds a yield value which rises with increasing electric field strength. The result can appear as an increase in apparent viscosity of several orders of magnitude. Many commercially realizable systems employing electrorheological fluids have bee developed which include variable damper assemblies. See Klass, U.S. Pat. No. 3,207,269; and Stangroom, U.K. Patent No. 2,111,171B. These devices operate by taking advantage of the ability of the electrorheological fluid to, in the presence of an electric field, "thicken" into a semisolid or solid condition where the particles of the fluid form into fibrillated, "pearl-chain" like structures between opposing surfaces of the device. This phenomenon can be utilized to engage relatively movable surfaces of the device for the control of translational motion between members connected thereto. While electrorheological fluid dampers are beneficial in providing for rapid and reversible response characteristics with typical response times being on the order of one millisecond, the force transmission limits of electrorheological fluid devices are constrained by the voltage potential and interactive surface area required to develop a fluid yield strength sufficient for their adequate performance.

Another type of electroactive fluids are electrophoretic (or "electroseparatable") fluids. Electrophoretic fluids are suspensions similar to electrorheological fluids but are characterized by a very different response to an applied electric field. The particles within electrophoretic fluids exhibit a very strong electrophoretic migration. Rather than forming, in the presence of an electric field, a fibrillated structure that has an induced yield strength, electrophoretic fluids separate into particle-rich and particle-deficient phases by electrophoresis. The electrophoretic induced separation can produce much larger yield strengths at lower operating voltages. Electrophoresis is a linear phenomenon with respect to electric field strength, while in contrast, the yield strength of an electrorheological fluid varies with the square of the electric field because of the dependence on induced dipole interactions for the electrorheological effect. Further, once electrophoretic induced separation is accomplished, the resulting yield strength of an electrophoretic fluid can be maintained under a reduced electric field.

Because electrophoretic fluids operate in a substantially different manner from electrorheological fluids in the presence of an electric field, their use in existing electrorheological fluid dampers and other devices would not be functional in many instances. Known electroactive fluid dampers depend on a fibrillated interaction of fluid particles for interconnecting relatively movable surfaces or restricting fluid flow or movement, and are not constructed to take advantage of the yield stress developed by separation of the fluid into particle-rich and particle-deficient phases.

In view of the foregoing, there is a need for a controllable damper which utilizes an electrophoretic fluid in association with its interactive surfaces to provide improved variable damping or braking.

SUMMARY OF THE INVENTION

It is therefore an object of the present invention to provide an improved damper assembly which utilizes an electrophoretic fluid to control the transmission of force between relatively movable members.

It is a further object of the present invention to provide an assembly of the above type in which a particle-rich phase of the electrophoretic fluid produced by an electric field may be utilized to effect engagement between piston and cylinder electrodes for sustaining forces between the relatively movable members.

It is a still further object of the present invention to provide an assembly of the above type in which raised surfaces formed of an insulating material having spaces or openings therein are positioned between the electrodes for either receiving or engaging the particle-rich phase depending on the polarity of the electric field between the electrodes.

Toward the fulfillment of these and other objects, a damper assembly is provided which is controlled by the application of an electric field to an electrophoretic fluid. The assembly may be configured as a shock absorber, linear brake or other related device and includes a piston slidably disposed within a cylinder connectable respectively to relatively movable members. The piston and cylinder include electrodes for generating an electric field between their confronting surfaces. An electrophoretic fluid is contained within the cylinder and is capable of separating into particle-rich and particle-deficient phases by electrophoresis. Control of this process is used to reversibly "jam" or lodge the particle-rich phase of the fluid between the electrodes for selectively coupling the piston and cylinder and hence controlling the transmission of force between the members.

An electrically nonconductive material having raised surface areas and spaces between the surface areas is associated with one or the other of the electrodes for effecting the coupling action between the electrodes. In the preferred embodiment, the material is applied to the surface of the piston electrode. When an electric field is applied between the electrodes in a first direction, the particle-rich phase of the fluid collects on one of the electrodes and also makes contact with the spaces and the raised surface areas of the material associated with the other electrode, thereby engaging or "locking" the electrodes and thus the piston and the cylinder together. When the polarity of the applied electric field is reversed, the particle-rich phase migrates to the other electrode by electrophoresis and collects in the spaces between the raised surface areas of the material, thereby disengaging the electrodes. The direction and intensity of the applied electric field may be varied for controlling the sequence and degree of coupling between the electrodes and thus the transmission of force between the members connected to the piston and the cylinder.

BRIEF DESCRIPTION OF THE DRAWINGS

For a better understanding of the invention, reference may be made to the following description of exemplary embodiments taken in conjunction with the figures of the accompanying drawings, in which:

FIG. 1 is a front elevational view in section depicting the damper of the present invention;

FIG. 2 is an enlarged, partially broken away perspective view depicting the piston assembly of the damper of FIG. 1;

FIGS. 3a-3c are enlarged, cross-sectional, schematic views of a portion of the electrodes of the damper of FIGS. 1-2 showing the operation of the electrophoretic fluid;

FIG. 4 is a reduced scale, front elevational view with a portion in section depicting an alternative embodiment of the damper of the present invention;

FIG. 4a is an enlarged view of the encircled portion of the piston assembly of FIG. 4;

FIG. 5 is a reduced scale, front elevational view similar to FIG. 4, but depicting another alternative embodiment of the damper of the present invention;

FIG. 5a is an enlarged view of the encircled portion of the piston assembly of FIG. 5;

FIG. 6 is a reduced scale, front elevational view similar to FIG. 4, but depicting another alternative embodiment of the damper of the present invention;

FIG. 6a is an enlarged view of the encircled portion of the piston assembly of FIG. 6;

DESCRIPTION OF THE PREFERRED EMBODIMENTS

Figure 7:
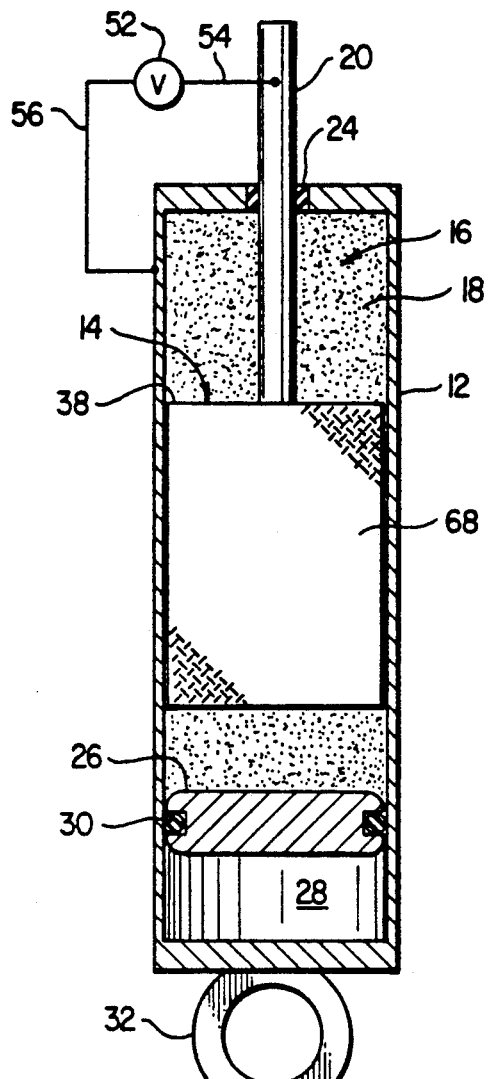
FIG. 7 is a reduced scale, front elevational view similar to FIG. 4, but depicting yet another alternative embodiment of the damper of the present invention.

In FIG. 1 of the drawings, there is designated by the reference numeral 10 a damper or similar device which employs features of the present invention. The damper 10 includes a cylinder 12 and a piston assembly 14 slideably disposed within the cylinder. The damper 10 may be used as a shock absorber, brake, locking or disengagement device in a wide variety of applications. For example, the damper 10 may be connected between relatively movable members (not shown) such as the frame and vehicle components of an automobile, robotic arms, linkage systems or other members in automotive, aerospace and robotic applications.

An enclosed chamber 16 is defined by the cylinder 12, for containing an electrophoretic fluid. The electrophoretic fluid is designated by particles 18 and is subsequently discussed in detail. A rod 20 is connected to the piston assembly 14 within the chamber 16, and extends outwardly from the chamber 16 through the top of the cylinder 12. A removable, fluid-tight cap 22 covers the top of the cylinder 12 and receives the rod 20 through an opening 23 in the cap. A seal 24 is also included in the cap 22 adjacent the opening 23 for preventing the electrophoretic fluid from exiting the cylinder 12 as the rod 20 is extended and retracted. A piston accumulator 26 is located within the cylinder 12 and defines a movable, lower wall for the chamber 16. The accumulator 26 allows for a necessary expansion and retraction of the volume of the chamber 16 caused by the displacement of the electrophoretic fluid during movement of the rod 20 into and out of the cylinder 12. An accumulator air space 28 is defined by the lower portion of the cylinder 12 beneath the accumulator 26. A compressible medium, such as air or other gas, occupies the air space 28 for accommodating axial movement of the accumulator 26, as required. The accumulator 26 is also provided with a seal 30 to prevent the electrophoretic fluid from seeping into the air space 28. The walls of the cylinder 12 are constructed of a conductive metal and operate as an electrode, as will be discussed. A fastener 32 connected to the end of the cylinder 12 and a threaded end 34 of the rod 20 may be used to attach the damper 10 between the relatively movable members (not shown).

Referring also to FIG. 2, the piston assembly of the damper 10 includes a rigid support 36 and a tubular piston electrode 38. The support 36 is constructed of a suitable nonconductive material and is affixed at its outer periphery to an inner wall of the piston electrode 38. An opening 40 is provided at the center of the support 36. As shown in FIG. 1, the opening 40 receives a reduced diameter, threaded end 42 of the rod 20, which is secured in place by a hexnut 44. Passages 46 extend through the support 36 which, as will be described, allow for communication of the electrophoretic fluid between upper and lower portions of the chamber 16 defined by the piston assembly 14 as the piston assembly moves relative to the cylinder 12.

A plurality of spaced, parallel ribs 48 are affixed to the piston electrode 38 and are constructed of a suitable nonconductive metal, plastic, ceramic, glass or composite material. The ribs 48 prevent direct contact and electrical arcing between the electrode 38 and the walls of the cylinder 12. Importantly, the ribs 48 also provide for controlled engagement and disengagement between the piston electrode 38 and the walls of the cylinder 12 by the electrophoretic fluid, in a manner to be discussed. A plurality of spaces 50 separate adjacent ribs 48. Both the ribs 48 and the spaces 50 are oriented so that their length is generally perpendicular to the direction of shear of the electrophoretic fluid during movement of the piston assembly 14 relative to the cylinder 12. The ribs 48 have a thickness relative to the surface of the member 14 which is typically a large fraction (e.g., 0.5–0.9) of the annular space between the piston electrode 38 and the walls of the cylinder 12.

A power source 52 is connected by wires 54 and 56 to the piston electrode 38 and the walls of the cylinder 12, respectively. The piston electrode 38 and the walls of the cylinder 12 are constructed of a rigid, electrically conductive material so that a voltage potential may be developed across the electrophoretic fluid in the annular space of the chamber 16 between the piston electrode and the walls of the cylinder. A central bore 58 is provided in the rod 20 for containing the wire 54. An opening 59 is provided in the rod 20 in proximity to the piston electrode 38. In this manner, the wire 54 may pass through the bore 58 and the opening 59 for connection to the piston electrode 38 as shown in FIG. 1.

The electrophoretic fluid contained within the chamber 16 generally comprises a carrier liquid containing a dispersed particulate material that experiences electrophoresis in the presence of an electric field. One example of an electrophoretic fluid is a commercial dispersion of polyvinylidene fluoride particles (PVF2) in dimethylphthalate and diisobutyl ketone. This is an example of a "positive" electrophoretic fluid, since the particulate material has a tendency to migrate to a positively charged electrode. Other electrophoretic fluid formulations are contemplated and may include "negative" electrophoretic fluids. Negative electrophoretic fluids are those in which the particulate material has a tendency to migrate to a negatively charged electrode.

During operation, the end 34 of the rod 20 and the fastener 32 of the cylinder 12 connect the damper 10 respectively to the relatively movable members (not shown). As the piston assembly 14 moves within the chamber 16 in response to movement of the members, the electrophoretic fluid is displaced by the piston assembly between upper and lower portions of the chamber through the passages 46. If the passages 46 are sufficiently large, there is little resistance provided by the support 36 to movement of the fluid between the upper and lower portions of the chamber 16 and the piston assembly 14 is able to move relatively freely in the chamber. As the rod 20 extends into the chamber 16, the increase in volume of the chamber displaces the accumulator 26 downwardly, compressing the air space 28. According to the present invention, control of the relative movement between the members (not shown) is regulated by adjusting the power source 52 to vary the voltage potential between the piston electrode 38 and the walls of the cylinder 12. In this manner, the engagement or mechanical coupling between the piston electrode 38 and the walls of the cylinder 12 is accomplished as desired by the electrophoretic fluid in response to the applied electric field.

FIGS. 3a–3c schematically illustrate the use of the electrophoretic fluid in the annular space between the walls of the cylinder 12 and the piston electrode 38 to vary the degree of the coupling between the cylinder walls and the piston electrode. As shown in FIG. 3a, the electrophoretic fluid exists as a fairly homogeneous suspension of the particles 20 between the walls of the cylinder 12 and the piston electrode 38 in the absence of an electric field. When translational motion of the piston electrode 38 relative to the cylinder 12 is initiated, the walls of the cylinder and the piston electrode are coupled only to the extent provided by the shear strength of the electrophoretic fluid in its homogeneous, dispersed state. Depending on the particular application and the viscosity of the fluid used, the foregoing transmission of force between the movable members (not shown) may be sufficient. For other applications, it may be desirable to more fully isolate the members. Alternatively, it may be desirable to increase the transmission of force between the members or fully lock the members.

In FIG. 3b, a voltage potential is applied to the electrophoretic fluid between the walls of the cylinder 12 and the piston electrode 38 by the power source 52 for more completely disengaging the cylinder relative to the piston electrode, and thus further isolating the movable members (not shown) from the transmission of force therebetween. The power source 52 applies a positive voltage to the piston electrode 38 so that the particles 20 (assuming a "positive" electrophoretic fluid) migrate by electrophoresis to the piston electrode. The electrophoretic fluid in this manner separates into a particle-rich phase and a particle-deficient phase as shown, where the particle-rich phase substantially fills the spaces 50 between the ribs 48. The particle-deficient phase is left to occupy the region between the raised surfaces of the ribs 48 and the walls of the cylinder 12. Because the particle-deficient phase is characterized by a reduced viscosity as compared to the fluid in the dispersed state (FIG. 3a), the cylinder 12 and the piston electrode 38 are relatively free to move with respect to each other unencumbered by significant viscous coupling.

In FIG. 3c, the polarity of the voltage applied by the power source 52 to the electrophoretic fluid between the walls of the cylinder 12 and the piston electrode 38 is reversed. Since the positive voltage is now applied to the walls of the cylinder 12, the particles 20 of the fluid migrate by electrophoresis to the cylinder walls. The particle-rich phase of the fluid collects on the walls of the cylinder 12, leaving the particle-deficient phase to occupy a portion of the spaces 40 in surface contact with the piston electrode 38. The particle-rich phase on the walls of the cylinder 12 also makes contact with the raised surfaces of the ribs 48 and "jams" or lodges in an outer portion of the spaces 50 between the ribs, thereby coupling the cylinder and the piston electrode 38. Thus, the electrophoretic fluid will engage or lock the cylinder 12 relative to the piston assembly 14 and operatively connect the members (not shown). It is understood that the magnitude of the electric field generated by the power source 52 may be regulated to control the coupling force and thus the transmission and conversion of force between the members.

The geometry of the ribs 48 and the spaces 50 may be alternatively configured according to the performance requirements of the damper 10. The relative size and orientation of the ribs 48 and the spaces 50, the applied voltage and the type of electrophoretic fluid used, may all be varied to meet particular system specifications. For example, the ribs 48 may be in the form of a continuous spiral over the surface of the piston electrode 38. Such a configuration could be made by covering the piston electrode 38 with an insulating layer of material and then cutting away a spiral groove down to or into the surface of the piston electrode. Alternatively, this configuration could also be made by wrapping a ribbon of insulating material around the piston electrode 38 in a spiral fashion. The spaces 50 may also be recessed in the piston electrode 38 instead of elevating the ribs 48 or increasing their elevation. The walls of the cylinder 12 may further be textured to enhance the locking strength of the particle-rich phase. In addition, the spacing or "gap" between the walls of the cylinder 12 and the piston electrode 38 may be varied. Where the spacing therebetween is sufficiently large, the particle-rich phase collected on the walls of the cylinder 12 may not be able to make contact with the surfaces of the ribs 48 and/or lodge in an outer portion of the spaces 50, thereby reducing the maximum force transmission which can be provided between the cylinder 12 and the piston assembly 14.

FIGS. 4–8 illustrate modifications to the damper 10 in which the ribs 48 and the spaces 50 are replaced with alternative structure to operate in substantially the same manner as previously described with reference to FIGS. 3a–3c.

In FIGS. 4 and 4a, a continuous insulating layer 60 of a suitable nonconductive metal, plastic or composite material is affixed to the piston electrode 38 of the damper 10 as shown. The layer 60 may be applied to the piston electrode 38 by adhesion, painting, casting, dipping, anodizing, printing, chemical vapor deposition, vacuum evaporation, sputtering, plasma spray or other suitable process. A plurality of discontinuous, short grooves 62 are included in the layer 60 which extend to the surface of the piston electrode 38 beneath the layer. The grooves 62 are oriented in a generally criss-cross pattern and may be preformed or formed by any variety of suitable techniques including machining, etching, grinding, drilling, etc. Although not shown, it is understood that, in operation, the particle-rich phase of the electrophoretic fluid will occupy the grooves 62 when attracted to the piston electrode 38. The particle-deficient phase therefore occupies the region between the walls of the cylinder 12 and the surfaces of the layer 60 which enhances disengagement of the piston assembly 14 relative to the cylinder. Similarly, when force transmission is desired and the voltage between the wall of the cylinder 12 and the piston electrode 38 is reversed (as previously described), the particle-rich phase will migrate toward the walls of the cylinder 12. The particle-rich phase of the fluid on the walls of the cylinder 12 also engages the raised surfaces of the layer 60 and lodges in the outer portion of the grooves 62, in a manner similar to that shown in FIG. 3c, for engagement of the piston assembly 14 relative to the cylinder.

In FIGS. 5 and 5a, the insulating layer 60 is affixed to the piston electrode 38 of the damper 10, as described above.

According to the embodiment of FIGS. 5 and 5a, a plurality of spaced circular holes 64 are included in the layer 60 which extend to the surface of the piston electrode 38 beneath the layer. The circular holes 64 may be arranged in any suitable pattern and varied in size as desired. Other uniform geometric shapes for the holes 64 are also contemplated. Although not shown, it is understood that the particle-rich phase of the fluid will occupy the holes 64 when attracted to the piston electrode 38 for disengagement of the piston electrode 38 relative to the walls of the cylinder 12. Similarly, when force transmission is desired the voltage potential between the walls of the cylinder 12 and the piston electrode 38 is reversed and the particle-rich phase migrates to the cylinder walls. The particle-rich phase of the fluid on the walls of the cylinder 12 also engages the raised surfaces of the layer 60 and lodges in an outer portion of the holes 64 for engagement of the piston assembly 14 relative to the cylinder.

In FIGS. 6 and 6a, the insulating layer 60 is also affixed to the piston electrode 38 of the damper 10, as described above. According to the embodiment, a plurality of irregular holes 66 are included in the layer 60 which extend to the surface of the piston electrode 38 beneath the layer. The holes 66 may be formed by a course grit or blasting process that chips away small regions of the layer 60, or by other techniques as described previously. Although not shown, it is understood that the particle-rich phase of the fluid will occupy the holes 66 when attracted to the piston electrode 38 for disengagement of the piston assembly 14 relative to the walls of the cylinder 12. Similarly, when the voltage potential is reversed the particle-rich phase of the fluid will migrate to the walls of the cylinder 12. The particle-rich phase on the walls of the cylinder 12 also engages the raised surfaces of the layer 60 and lodges in an outer portion of the holes 64 for engagement of the piston electrode 38 relative to the walls of the cylinder 12.

In FIG. 7, there is depicted an insulating grid 68 which may be separately formed of a single piece or mesh of insulating material and then fitted over the piston electrode 38 of the damper 10. According to the embodiment, the grid 68 is constructed of a suitable nonconductive material and has a plurality of holes 70 extending therethrough. The holes 70 may be formed by perforating the grid 68 or may be defined when the grid is made from a woven, open weave fabric or screen. A variety of sizes, arrangements and patterns for the holes 70 are contemplated. It is understood that the grid 68 may be either flexible or rigid and is affixed to the piston electrode 38 by gluing, adhesive bonding, mechanical attachment, press fit or other means. Although not shown, during operation, the particle-rich phase of the fluid will occupy the holes 70 when attracted to the piston electrode 38 for disengagement of the piston assembly 14 relative to the cylinder 12. When force transmission is desired, the polarity of the voltage potential is reversed and the particle-rich phase of the fluid migrates to the walls of the cylinder 12. The particle-rich phase on the walls of the cylinder 12 also engages the grid 68 and lodges in an outer portion of the holes 70 for engagement of the piston assembly 14 relative to the cylinder.

Although not shown in the drawings, it is contemplated that for each of the described embodiments of the damper 10, the ribs 48, the insulating layer 60 or the grid 68 may alternatively be affixed to the walls of the cylinder 12, or rigidly supported in the space between the cylinder walls and the piston electrode 38 and connected in a spaced relationship to either the cylinder or the piston electrode.

Figure 8:
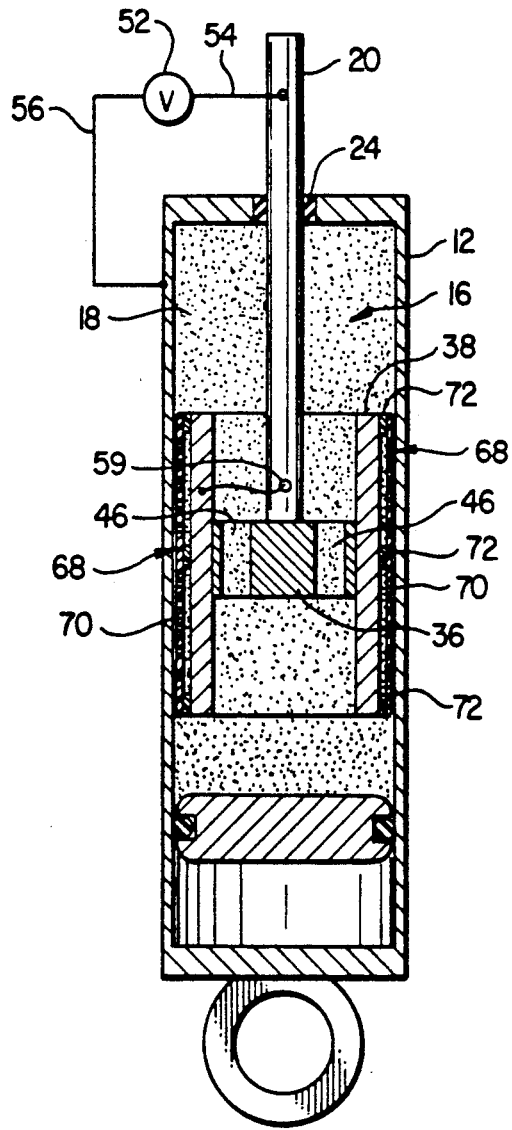
FIG. 8 is a reduced scale, front elevational view in section similar to FIG. 1, but depicting an alternative embodiment of the damper of the present invention.

In FIG. 8, for example, an embodiment of the damper 10 is shown in which the grid 68 is spaced between the walls of the cylinder 12 and the piston electrode 38. According to this embodiment, the grid 68 is supported by retaining members 72 which rigidly connect the grid to the piston electrode 38. Since the grid 68 is not in direct contact with the piston electrode 38, but is instead spaced away therefrom additional room is provided for the particle-rich phase of the fluid to occupy the annular space between the grid and the piston electrode for improved disengagement of the damper 10. Thus, although not shown, it is understood that when the particle-rich phase of the fluid is attracted to the piston electrode 38, the particles 20 will pass through the holes 70 of the grid 68 and fill the annular space between the grid and the piston electrode, and the particle-deficient phase of the fluid will fill the annular space between the grid and the walls of the cylinder 12, for disengagement. Although not shown, when the polarity of the voltage potential between the walls of the cylinder 12 and piston electrode 38 is reversed so that the particle-rich phase collects on the cylinder, a portion of the particle-rich phase on the cylinder walls will make contact with the raised surfaces of the grid 68 and will lodge in at least an outer portion of the holes 70 thus engaging the cylinder and grid. Since the grid 68 is attached by the members 72 to the piston electrode 38, the damper 10 is engaged.

The described damper assemblies employing features of the present invention may be used for a wide variety of applications and are representative embodiments only. A latitude of modification, change and substitution is therefore intended in the foregoing disclosure and in some instances, some features of the invention will be employed without a corresponding use of other features. Accordingly, it is appropriate that the appended claims be construed broadly and in a manner consistent with the scope of the invention.

What is claimed is:

1. An apparatus for controlling the transmission of force between relatively movable members, said apparatus comprising at least two electrodes slidably disposed relative to each other and respectively connected to said members, an electrophoretic fluid in surface contact with said electrodes for transmitting force between said members and capable of separating into a particle-rich phase and a particle-deficient phase in the presence of an electric field, means for applying an electric field between said electrodes and to said fluid to separate said fluid into said particle-rich phase and said particle-deficient phase, said particle-rich phase migrating to one or the other of said electrodes depending on the direction of application of said electric field, means for forming a plurality of spaced and electrically insulating raised surfaces on one of said electrodes so that during application of said electric field in one direction said particle-rich phase collects on the other of said electrodes and extends between said other electrode and said raised surfaces to transmit a predetermined force between said members, and during application of said electric field in the other direction, said particle-rich phase of said fluid migrates to said one electrode and collects in the spaces between said raised surfaces to substantially reduce said force transmission.

2. The apparatus according to claim 1 wherein upon application of said electric field in said one direction said particle-rich phase collected on said other electrode lodges in at least an outer portion of said spaces between said raised surfaces for transmitting said force between said members.

3. The apparatus according to claim 1 wherein said electrodes comprise a piston slidably disposed within a cylinder.

4. The apparatus according to claim 1 wherein said other of said electrodes includes a textured surface in contact with said fluid.

5. The apparatus according to claim 1 wherein said means for forming a plurality of spaced raised surfaces comprises an electrically nonconductive material.

6. The apparatus according to claim 1 wherein said means for forming a plurality of spaced raised surfaces is spaced away from and connected to said one electrode.

7. The apparatus according to claim 1 wherein said means for forming a plurality of spaced raised surfaces comprises a plurality of rib members.

8. The apparatus according to claim 7 wherein said rib members are oriented perpendicular to the direction of fluid shear during movement of said electrodes relative to each other.

9. The apparatus according to claim 1 wherein said means for forming a plurality of spaced raised surfaces comprises a grid.

10. The apparatus according to claim 1 wherein said means for forming a plurality of spaced raised surfaces comprises a layer of material having a plurality of grooves.

11. The apparatus according to claim 1 wherein said means for forming a plurality of spaced raised surfaces comprises a layer of material having a plurality of openings.

12. The apparatus according to claim 11 wherein said openings are circular in shape.

13. The apparatus according to claim 11 wherein said openings are irregular in shape.

14. The apparatus according to claim 1 wherein said force transmission may be varied in proportion to the strength of said electric field applied to said electrophoretic fluid.

15. An apparatus for controlling the transmission of force between relatively movable members, said apparatus comprising a piston electrode slidably disposed within a cylinder electrode, said electrodes being operatively connected to respective ones of said members, an electrophoretic fluid in surface contact with said electrodes for transmitting force between said members, wherein said fluid is separatable into particle-rich and particle-deficient phases in the presence of an electric field, means for applying an electric field between said electrodes and to said fluid to separate said fluid into said particle-rich and particle-deficient phases, said particle-rich phase migrating to one or the other of said electrodes depending upon the direction of application of said electric field, means for forming a plurality of spaced and electrically insulating raised surfaces on one of said electrodes so that during application of said electric field in one direction, said particle-rich phase collects on the other of said electrodes and extends to said spaced raised surfaces and into at least an outer portion of the spaces between said raised surfaces on said one electrode to transmit a selected force between said members, and during application of said electric field in the other direction, said particle-rich phase of said fluid migrates to said one electrode and collects in the spaces between said raised surfaces leaving said particle-deficient phase in contact with said other electrode to substantially reduce said force transmission.

16. A method for controlling the transmission of force between relatively movable members comprising the steps of providing electrodes in mechanical engagement with respective ones of said members, slidably disposing said electrodes relative to each other, forming spaced and electrically insulating raised surfaces on at least one of said electrodes, confining an electrophoretic fluid between said electrodes which is separatable into particle-rich and particle-deficient phases in the presence of an electric field, and applying an electric field between said electrodes and to said fluid in a first direction for causing said particle-rich phase to collect on the other of said electrodes and engage said raised surfaces and at least an outer portion of the spaces between said raised surfaces on said one electrode thereby coupling said electrodes for transmitting a selected force between said members.

17. The method according to claim 16 further comprising the step of applying an electric field between said electrodes and to said fluid in a second direction for causing said particle-rich phase to collect in the spaces between said raised surfaces on said one electrode leaving said particle-deficient phase in contact with said other electrode thereby decoupling said electrodes and decreasing the transmission of force between said members.

* * * * *

UNITED STATES PATENT AND TRADEMARK OFFICE
CERTIFICATE OF CORRECTION

PATENT NO. : 5,018,606

DATED : May 28, 1991

INVENTOR(S) : Carlson

It is certified that error appears in the above-identified patent and that said Letters Patent is hereby corrected as shown below:

Col. 1, line 39, change "bee" to --been--.

Col. 7, line 24, change "wall" to --walls--.

Col. 8, line 48, change "therefrom additional" to --therefrom, additional--.

Signed and Sealed this

Twenty-second Day of December, 1992

Attest:

DOUGLAS B. COMER

Attesting Officer

Acting Commissioner of Patents and Trademarks